United States Patent [19]

Yamaguchi et al.

[11] 4,187,345

[45] Feb. 5, 1980

[54] MAGNETIC RECORDING MEDIUM

[75] Inventors: Nobutaka Yamaguchi; Masaaki Fujiyama; Satoru Takayama, all of Odawara, Japan

[73] Assignee: Fuji Photo Film Co., Ltd., Minami-ashigara, Japan

[21] Appl. No.: 935,123

[22] Filed: Aug. 21, 1978

Related U.S. Application Data

[63] Continuation of Ser. No. 836,709, Sep. 26, 1977, abandoned.

[30] Foreign Application Priority Data

Sep. 26, 1976 [JP] Japan .................................. 51-116025

[51] Int. Cl.² .............................................. H01F 10/00
[52] U.S. Cl. ...................... 428/337; 428/341; 428/342; 428/421; 428/422; 428/474; 428/480; 428/500; 428/539; 428/900
[58] Field of Search .................. 427/127-132, 427/48; 252/62.54; 428/900, 341, 342, 421, 422, 474, 480, 500, 539

[56] References Cited

U.S. PATENT DOCUMENTS

| | | | |
|---|---|---|---|
| 2,804,401 | 8/1957 | Cousino | 117/138.8 |
| 3,293,066 | 12/1966 | Haines | 117/68 |

*Primary Examiner*—Bernard D. Pianalto
*Attorney, Agent, or Firm*—Armstrong, Nikaido, Marmelstein & Kubovcik

[57] ABSTRACT

This invention relates to a magnetic recording medium which comprises a support having a surface roughness of at most 0.35 micron, a magnetic recording layer on one side of the support and a lubricant layer containing a lubricant represented by the following general formula,

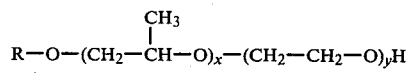

in which $R = C_n H_{2n+1}$, $n = 12-18$, $x = 0-8$ and $y = 1-50$ and being coated onto the opposite side to the magnetic recording layer with a mean coating quantity of 1 to 500 mg/m².

9 Claims, 3 Drawing Figures

MAGNETIC RECORDING MEDIUM

This is a continuation of application Ser. No. 836,709, filed Sept. 26, 1977 and now abandoned.

BACKGROUND OF THE INVENTION

1. Field of the Invention

The present invention relates to a magnetic recording medium having a running stability and more particularly, it is concerned with a magnetic recording tape suitable for short wavelength recording and having a decreased coefficient of friction.

2. Description of the Prior Art

Of late, high density recording has been desired in magnetic recording tapes, in particular, video tapes and, according to the improvement of the properties of magnetic recording layers, the recording wavelength has been decreased from 6 microns to 2 microns and the supply speed of a tape has also been decreased from 38 cm/sec to 7.5 cm/sec. On the other hand, the change of a tape caused by temperature, frictions, etc. has not been neglected with the progress of high density recording. In comparison of the cases wherein the tape supply speed is 38 cm/sec and the recording wavelength is 4 microns and wherein the tape supply speed is 3 cm/sec and the recording wavelength is 2 microns, for example, the latter case requires a better surface property of a tape than the former case, thus resulting in that a tape stickslip and running unevenness tend to occur readily.

In the magnetic tapes of the prior art, (1) the base surface side is not treated, (2) has a back coat layer consisting mainly of carbon black and (3) is coated with a lubricant such as graphite or molybdenum disulfide as in endless tapes.

The magnetic tape of the type (1) has predominantly been used at present, which has, howwever, the problem that due to the exposed support base, the coefficient of friction is increased when the relative speed of the tape is decreased, the tape tends to be scratched at a guide pole section and many drop outs take place.

The magnetic tape of the type (2) has been used in video tapes for broadcasting, video tapes for business, etc. for the purpose of improving the winding state of the tape, in particular, art a high tape speed supply, which has, however, the problem that because of having an inorganic pigment in the back coat layer, there is a surface roughness causing deterioration of short wavelength signals and increase of noises, the surface roughness of the back coat is transferred to the magnetic layer during storage resulting in increase of noises with the passage of time and a tape path is often abraded by the back layer.

The magnetic tape of the type (3) has been used for the purpose of lowering the coefficient of friction between the magnetic layer and the opposite layer thereto as in an endless tape of Lear Jet type, which has, however, the problem that, as in the case of the above described type (2), there are deterioration of short wavelength signals and increase of noises.

SUMMARY OF THE INVENTION

It is an object of the invention to provide a magnetic recording medium having a magnetic recording layer on one side of a non-magnetic support and a lubricant layer on the other side.

It is another object of the invention to provide a magnetic recording medium with a decreased coefficient of friction at a supply speed of 5 cm/sec or less.

It is a further object of the invention to provide a magnetic tape suitable for short wavelength recording.

It is a still further object of the invention to provide a magnetic recording medium with a decreased drop out even by repeated use.

These objects can be attained by a magnetic recording medium which comprises a support having a surface roughness of 0.35 micron or less, a magnetic recording layer on one side of the support and a lubricant layer containing a lubricant represented by the following general formula,

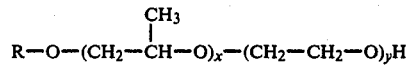

in which $R=C_nH_{2n+1}$, $n=12-18$, $x=0-8$ and $y=1-50$ and being coated onto the opposite side to the magnetic recording layer with a mean coating quantity of 1 to 500 mg/m$^2$.

BRIEF DESCRIPTION OF THE DRAWING

The accompanying drawings are to illustrate the principle and merits of the invention in greater detail.

DETAILED DESCRIPTION OF THE INVENTION

We, the inventors, have made efforts to overcome the above described disadvantages of the prior art and consequently have found that our objects can be accomplished by a magnetic recording medium which comprises a support having a surface roughness of 0.35 micron or less, measured by means of a Stylus-type roughness tester (0.23 micron or less measured by means of an interference microscope), a magnetic recording layer on one side of the support and a lubricant layer containing a lubricant represented by the following general formula,

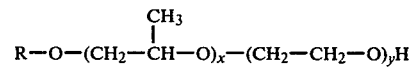

in which $R=C_nH_{2n+1}$, $n=12-18$, $x=0-8$ and $y=1-50$ and being coated onto the opposite side to the magnetic recording layer with a mean coating quantity of 1 to 500 mg/m$^2$. The present invention is based on this finding.

Figure 1:
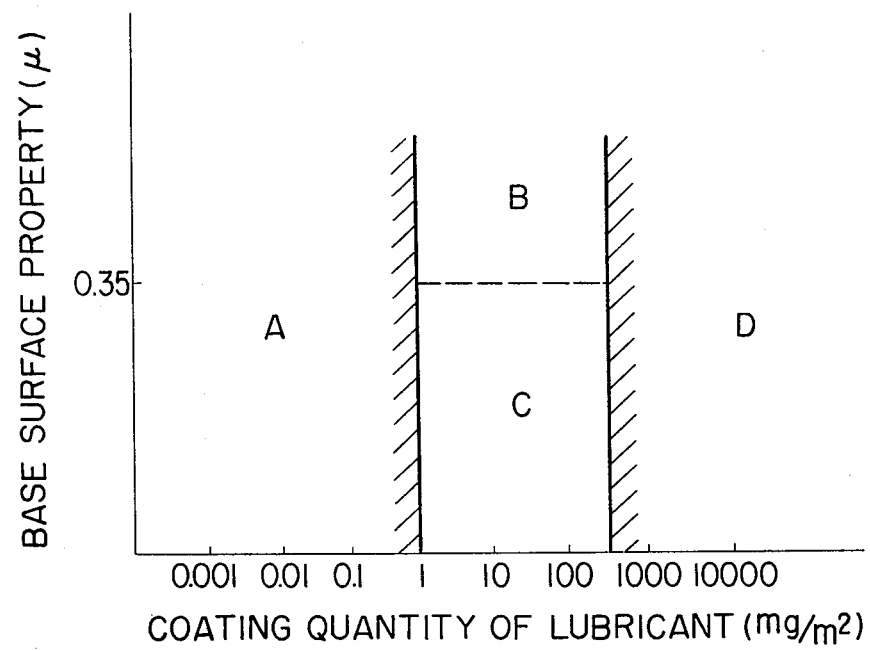
FIG. 1 shows the relation of the property of the magnetic recording medium according to the present invention with the coating quantity of the lubricant and the base surface property.

Referring to FIG. 1, there is shown the relation of the property of the magnetic recording medium according to the present invention, such as coefficient of friction, with the coating quantity of the lubricant and the base surface property. In Zone A, the coefficient of friction is high, in Zone B, the lowering effect of the coefficient of friction is not so large and in Zone D, the lubricant exudes and transfers to the magnetic layer, thus spoiling the video head of a VTR so that an image does not appear. Zone C only is effective.

In the magnetic recording medium of the present invention, the support has a surface roughness of 0.35 micron or less, measured by means of a Stylus-type roughness tester and 0.23 micron or less, measured by means of an interference microscope, and the thickness of the support is not particularly limited, but, preferably, ranges from 2 to 38 microns. As the support base, there can be used ordinary materials, for example, polyesters such as polyethylene terephthalate and polyethylene-2,6-naphthalate, polyolefine such as polyethylene and polypropylene, cellulose derivatives such as cellulose triacetate and cellulose diacetate and other plastics such as polycarbonates, polyamides, polyimides, polytetrafluoroethylene, polytrifluoroethylene, polyvinyl chloride and polyvinylidene chloride.

As the ferromagnetic fine powder, there are used $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, Berthollide compounds of $\gamma\text{-Fe}_2\text{O}_3$ and $\text{Fe}_3\text{O}_4$ ($\text{FeO}_x$: $1.33 < x < 1.50$), Co-doped Berthollide compounds of $\gamma\text{-Fe}_2\text{O}_3$ and $\text{Fe}_3\text{O}_4$ ($\text{FeO}_x$: $1.33 < x < 1.50$, $\text{CrO}_2$, Co-Ni-P alloys, Co-Ni alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of the order of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, metacrylateacrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber-based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferable resins are those which do no soften or melt before the resin thermally decomposes. Typical examples of these resins are phenol resins, epoxy resins, polyurethane hardening type resins, urea resins, melamine resins, alkyd resins, silicone resins, acryl-based reactive resins, epoxy-polyaide resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanate, polyamide resins and mixtures thereof, etc. Examples of these resins are described in, for example, Japanese Patent Publication Nos. 8103/1964, 9779/1965, 7192/1966, 14275/1966, 18179/1967, 8016/1966, 12081/1968, 28023/1969, 14501/1970, 13103/1971, 22065/1972, 22066/1972, 22067/1972, 22072/1972, 22073/1972, 28045/1972, 28048/1972, 28922/1972 and U.S. Pat. Nos. 3,144,353, 3,320,090, 3,437,510, 3,597,273, 3,781,210, 3,781,211, etc. These binders can be used individually or in combination wth each other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Formation of the magnetic layer is carried out by dissolving or dispersing the above described composition in an organic solvent and then coating the composition onto a support.

Typical organic solvents which can be used in the coating composition include ketones such as acetone, methyl ethyl ketone, methyl isobutyl ketone, cyclohexane and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like.

The lubricant represented by the foregoing general formula is generally coated onto a support in a proportion of 1 to 500 mg/m$^2$, preferably 1 to 200 mg/m$^2$ with an ordinary organic solvent. Useful examples of the organic solvent used in the lubricant layer are n-butyl acetate, methyl ethyl ketone, ethanol, etc.

The magnetic layer is generally formed as described above in the present invention, but it is not particularly limited and preferably has a surface roughness of 0.25 micron or less for the purpose of the present invention.

The magnetic layer can also be provided by other methods than those described above, for example, by electroplating, electroless plating, vapor deposition, sputtering, ionic plating and the like.

When the magnetic recording medium of the present invention is used at a relative tape speed of 5 cm/sec or less, the best effects can be given.

The effects or advantages obtained by the use of the magnetic recording medium according to the present invention are summarized below:

(1) The coefficient of friction of the base surface is lowered.

(2) Running of the tape becomes stable due to (1).

(3) Jitter is decreased due to (1).

(4) Scraping of the base is decreased due to (1).
(5) Drop outs by repeated use are little.
(6) The lubricant of the present invention is less hygroscopic than the commonly used antistatic agents such as quaternary ammonium salts and is not so affected by humidity.

The present invention will be explained in detail with reference to the following examples. It will be obvious to one skill in the art that various changes and modifications can be made in the components, ratios, operational order and the like without departing from the spirit of the present invention. Therefore, the present invention should not be construed as being limited to the following examples.

EXAMPLE 1

One side of a polyethylene terephthalate base having a thickness of 14 microns was coated with a magnetic layer having the following composition to give a coating thickness of 5 microns on dry base and then subjected to a calendering treatment in known manner in the production of video tapes.

The other side of this tape was coated with a lubricant represented by the formula,

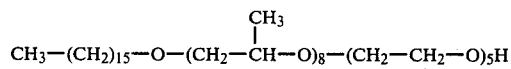

(commercial name: "PBC-2" manufactured by Nikko Chemicals Co.) dissolved in methyl isobutyl ketone, dried and cut in a width of ½ inch. Under various conditions, Sample Nos. 10 were prepared and subjected to measurement of the coefficient of friction.

| Magnetic Layer | |
| --- | --- |
| Ferromagnetic Iron Oxide (γ-Fe$_2$O$_3$, grain size: 0.5×0.07×0.07μ) | 300 g |
| Nitrocellulose | 75 g |
| Dibutyl Phthalate | 14 g |
| Acrylic Acid Ester Resin | 20 g |
| Silicone Oil | 2 g |
| Lecitin | 6 g |

Method of Assessment (1) Jitter

Where Stair step signals are recorded and reproduced, picture trembling from side to side is subjected to visual comparison and measurement as to components of 1 to 5 KHz. The degree of picture trembling is assessed by indices of from A to D, A representing minimal picture trembling and D representing much picture trembling.

(2) Running Stability

In the assessment (1), picture trembling side to side is visually assessed at a frequency of 1 KHz or less and the degree of picture trembling is shown by indices of from A to C, A representing minimal picture trembling and C representing much picture trembling.

(3) Video Color Noise

Measurement is carried out using a video color noise meter (925 C manufactured by Shibasoku Co., Ltd.) and a signal generator (16 UIA Plug-in Unit. manufactured by Shibasoku Co., Ltd.)

(4) Drop Out

After a signal of 4.5 MHz is recorded and then reproduced 25 times with a relative speed of 6 m/sec and head track width of 60 μm, drop outs (15 μsec, 18 dB) are measured by means of a drop out counter (IDC-2 manufactured by NJS).

Figure 2:
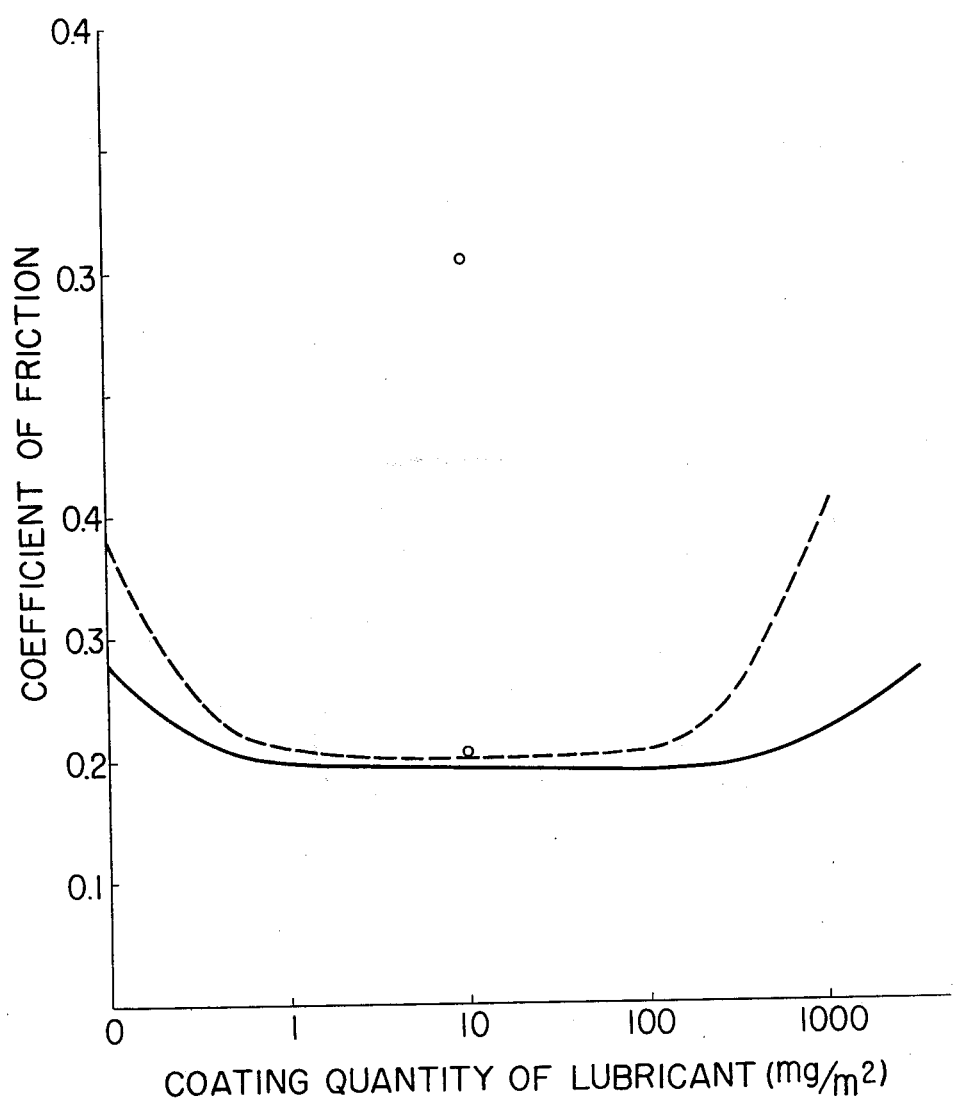
FIG. 2 shows the relation of the coating quantity of the lubricant and the coefficient of friction in one embodiment of the present invention.
Figure 3:
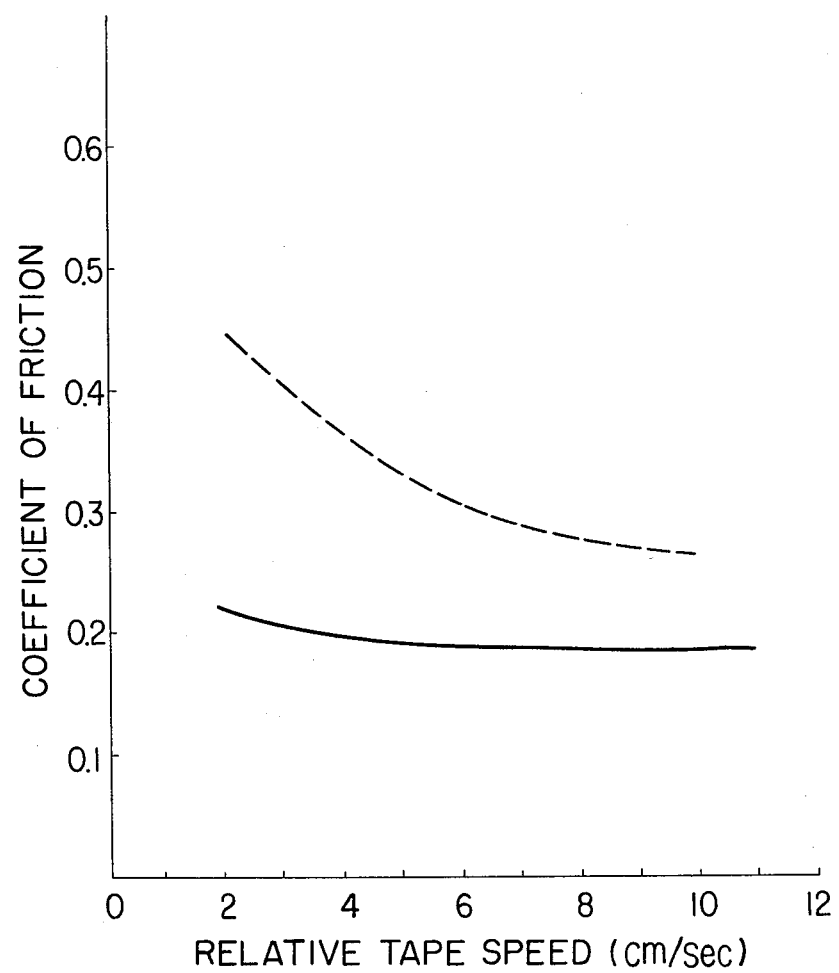
FIG. 3 shows the relation of the tape relative speed and the coefficient of friction in one embodiment of the present invention.

In FIG. 2, there is shown the relation of the coating quantity of polyoxyethylenepolyoxypropylene cetyl ether (mg/m$^2$) and the coefficient of friction, in which the broken line corresponds to a case at a tape supply speed of 3.5 cm/sec and the solid line corresponds to another case at a tape supply speed of 9.5 cm/sec. In FIG. 3, there is shown the relation of the relative tape speed (cm/sec) and the coefficient of friction, in which the broken line corresponds to Sample No. 3 and the solid line corresponds to Sample No. 6.

It will clearly be understood from the above described examples and the accompanying drawings that (1) the coefficient of friction is markedly decreased at a lubricant coating quantity of 1 mg/m$^2$ and held desirable up to 500 mg/m$^2$ as apparent from FIG. 2, (2) the effect of coating the lubricant is remarkable at a low relative tape speed as apparent from FIG. 3 while the effect of coating the lubricant is not remarkable at a high relative tape speed as apparent from FIG. 2, and (3) the effect of the lubricant is not remarkable in a case where the surface property of the base is inferior, as apparent from the examples.

EXAMPLE 2

Table 1

| Sample No. | Base Surface Roughness (μ) | Amount of Lubricant Coated (mg/m$^2$) | Jitter | Video Color Noise (dB) | Drop Out (/min) | Running stability |
| --- | --- | --- | --- | --- | --- | --- |
| 1 | 0.56 | 0 | B | 0 | 115 | A |
| 2 | 0.56 | 5 | B | 0 | 71 | A |
| 3 | 0.33 | 0 | D | −2.5 | 213 | C |
| 4 | 0.33 | 0.5 | C | −2.5 | 47 | B |
| 5 | 0.33 | 1 | B | −2.5 | 22 | A |
| 6 | 0.33 | 10 | A | −2.5 | 18 | A |
| 7 | 0.33 | 50 | A | −2.5 | 15 | A |
| 8 | 0.33 | 100 | A | −2.5 | 16 | A |
| 9 | 0.33 | 500 | B | −2.5 | 15 | A |
| 10 | 0.33 | 1000 | D | −2.5 | 13 | B - C |

The procedure of Example 1 was repeated except using lubricants represented by

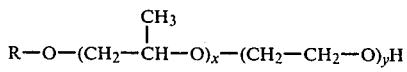

in which x, y and n (number of C in R) were varied within the scope of the present invention (Sample Nos. 11 to 20) and outside the scope of the present invention (Sample Nos. 21 to 25), thus obtaining magnetic tapes and then the magnetic tapes are subjected to measurement of the coefficient of friction, thus obtaining results shown in Table 2. The relative tape speed was 3.5 cm/sec, the base surface property was 0.33 micron and the other conditions were similar to those of Example 1.

Table 2

| Sample No. | n | x | y | Coating Quantity of Lubricant (mg/m$^2$) | Coefficient of Friction |
| --- | --- | --- | --- | --- | --- |
| 11 | 16 | 8 | 1 | 10 | 0.20 |
| 12 | 16 | 8 | 5 | 10 | 0.20 |
| 13 | 16 | 8 | 10 | 10 | 0.22 |
| 14 | 16 | 8 | 20 | 10 | 0.25 |
| 15 | 16 | 8 | 50 | 10 | 0.30 |
| 16 | 16 | 8 | 50 | 100 | 0.25 |
| 17 | 12 | 8 | 5 | 10 | 0.20 |
| 18 | 18 | 8 | 5 | 10 | 0.21 |
| 19 | 16 | 0 | 5 | 10 | 0.25 |
| 20 | 16 | 3 | 5 | 10 | 0.23 |
| 21 | 30 | 10 | 100 | 10 | 0.35 |
| 22 | 30 | 10 | 100 | 100 | 0.35 |
| 23 | 30 | 10 | 100 | 500 | 0.31 |
| 24 | 30 | 10 | 100 | 1 | 0.40 |
| 25 | 30 | 0 | 0 | 10 | 0.38 |

In Sample Nos. 11 to 20, the friction coefficients are generally low. As in the case of Sample No. 15, the friction coefficient is somewhat higher, but, as in the case of Sample No. 16, it can be reduced to a practical level by increasing the coating quantity of the lubricant. In Sample Nos. 21 to 25, the friction coefficient is not so reduced.

What is claimed is:

1. A magnetic recording medium which comprises a support having a surface roughness of at most 0.35 micron, a magnetic recording layer on one side of the support and a lubricant layer on the other side of the support, the lubricant layer being a lubricant represented by the following general formula:

$$R-O-(CH_2-\underset{\underset{CH_3}{|}}{C}H-O)_x-(CH_2-CH_2-O)_yH$$

in which $R = C_nH_{2n+1}$, $n = 12-18$, $x = 0-8$ and $y = 1-50$, which is coated on the support in a mean coating quantity of 1 to 200 mg/m$^2$ and which is applied to the support in the form of a solution in an organic solvent.

2. The magnetic recording medium as claimed in claim 1, wherein the support is of a material selected from the group consisting of polyesters such as polyethylene terephthalate and polyethylene-2,6-naphthalate, polyolefins such as polyethylene and polypropylene, cellulose derivatives such as cellulose triacetate and cellulose diacetate and other plastics such as polycarbonates, polyamides, polyimides, polytetrafluoroethylene, polytrifluoroethylene, polyvinyl chloride and polyvinylidene chloride.

3. The magnetic recording medium as claimed in claim 1, wherein the support has a thickness of 2 to 38 microns.

4. The magnetic recording medium as claimed in claim 1, wherein the magnetic recording layer comprises a ferromagnetic fine powder, binder and coating solvent.

5. The magnetic recording medium as claimed in claim 1, wherein the magnetic recording layer has a surface roughness of at most 0.25 micron.

6. The magnetic recording medium as claimed in claim 4, wherein the ferromagnetic fine powder is selected from the group consisting of $\gamma$-Fe$_2$O$_3$, Co-doped $\gamma$-Fe$_2$O$_3$, Fe$_3$O$_4$, Co-doped Fe$_3$O$_4$, Berthollide compounds of $\gamma$-Fe$_2$O$_3$ and Fe$_3$O$_4$, Co-doped Berthollide compounds of $\gamma$-Fe$_2$O$_3$ and Fe$_3$O$_4$, CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

7. The magnetic recording medium as claimed in claim 4, wherein the binder is selected from the group consisting of thermoplastic resins, thermosetting resins and mixtures thereof.

8. The magnetic recording medium as claimed in claim 4, wherein said coating solvent is selected from the group consisting of ketones, alcohols, esters, ethers, glycol ethers, aromatic hydrocarbons, chlorinated hydrocarbons, tetrahydrofuran and dimethyl sulfoxide.

9. The magnetic recording medium of claim 1 wherein the lubricant has the formula:

$$CH_3-(CH_2)_{15}-O-(CH_2-\underset{\underset{CH_3}{|}}{C}H-O)_8-(CH_2-CH_2-O)_5H$$

* * * * *